United States Patent
White (10) Patent No.: US 7,788,153 B1
(45) Date of Patent: *Aug. 31, 2010

(54) SYSTEM AND METHOD FOR MANAGING DEDICATED USE OF A CREDIT ACCOUNT

(75) Inventor: Robert D. White, Midlothian, VA (US)

(73) Assignee: Capital One Financial Corporation, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/509,177

(22) Filed: Jul. 24, 2009

Related U.S. Application Data (63) Continuation of application No. 10/642,769, filed on Aug. 18, 2003, now Pat. No. 7,584,126.

(51) Int. Cl.
*G06Q 40/00* (2006.01)
(52) U.S. Cl. .............................. 705/35; 705/39; 705/40
(58) Field of Classification Search .................. 705/35, 705/39, 40; 235/487
See application file for complete search history.

(56) References Cited

U.S. PATENT DOCUMENTS

| | | | |
|---|---|---|---|
| 6,018,718 | A | 1/2000 | Walker et al. |
| 2002/0082920 | A1 | 6/2002 | Austin et al. |
| 2003/0050831 | A1 | 3/2003 | Klayh |
| 2003/0061093 | A1 | 3/2003 | Todd |
| 2003/0061097 | A1 | 3/2003 | Walker et al. |
| 2003/0097270 | A1 | 5/2003 | Musselwhite et al. |
| 2003/0105689 | A1 | 6/2003 | Chandak et al. |
| 2003/0115100 | A1 | 6/2003 | Teicher |

OTHER PUBLICATIONS

Mayer, C., "Read 'Em and Weep: Cardholders see Rates Rise based on Other Debts", The Washington Post, Final Edition, p. E01, Dec. 2001.
Paradis, N., Account Closing Causes Commotion Series, May 1999, St. Petersburg Times, South Pinellas Edition, p. 2 D.
Richardson, N., Milwaukee Journal Sentinel, Final Edition, Mar. 2002, Milwaukee Journal Sentinel, p. 7 C.
Wood, Otis v. Lucy Lady Duff-Gordon, Dec. 1917, NY Reporter or NE West reporter, 222 NY or 118 NE, 88-92 or 214-217.

*Primary Examiner*—James P Trammell
*Assistant Examiner*—Scott S Trotter
(74) *Attorney, Agent, or Firm*—Hunton & Williams LLP (57) ABSTRACT

A method of managing dedicated use of a credit account is provided. The method includes receiving information regarding a credit account, associating the credit account with a usage program, where the usage program includes terms of dedicated use and where the terms of dedicated use are associated with providing benefits to the customer in return for dedicated use of the credit account, providing a benefit to the customer according to the terms, monitoring credit activity corresponding to the credit account, and maintaining the benefit if the monitored credit activity satisfies the terms of dedicated use.

20 Claims, 3 Drawing Sheets

SYSTEM AND METHOD FOR MANAGING DEDICATED USE OF A CREDIT ACCOUNT

RELATED APPLICATIONS

This patent application is a Continuation of U.S. patent application Ser. No. 10/642,769, filed on Aug. 18, 2003, which is hereby incorporated by reference in its entirety.

TECHNICAL FIELD OF THE INVENTION

This invention relates in general to credit accounts and more particularly to a system and method for offering dedicated use of a credit account.

BACKGROUND OF THE INVENTION

A credit card issuer, such as a bank or other financial institution, generally provides credit accounts to customers, or cardholders, that allow the customers to make purchases on credit rather than using cash. Customers incur debt with each credit card purchase, which may be repaid over time according to the terms and conditions of the particular customer's credit account. In many circumstances, a customer may obtain several credit accounts, each credit account issued by a different credit card issuer.

SUMMARY OF THE INVENTION

In accordance with the present invention, systems and methods for offering a dedicated use credit account are provided. In general, a credit card issuer may provide a customer with a credit account that offers benefits to the customer in return for dedicated use of the credit account. The customer may participate in a loyalty program or other similar program in which a customer's credit account is established as an exclusive use credit account. The customer may receive benefits in return for exclusive use of the credit account. In some embodiment, the exclusive use credit account may be associated with a backup credit account that may be used if the exclusive use credit account is not available, or if joint customers of a credit account wish to accrue benefits under the program. In particular embodiments, the credit card issuer determines the benefits according to a customer level of usage, which the credit card issuer monitors using a credit report corresponding to the customer.

According to one embodiment, a method for managing dedicated use of a credit account is provided. The method includes receiving information regarding a credit account, associating the credit account with a usage program, where the usage program includes terms of dedicated use and where the terms of dedicated use are associated with providing benefits to the customer in return for dedicated use of the credit account, providing a benefit to the customer according to the terms, monitoring credit activity corresponding to the credit account, and maintaining the benefit if the monitored credit activity satisfies the terms of dedicated use.

Various embodiments of the present invention may benefit from numerous advantages. It should be noted that one or more embodiments may benefit from some, none, or all of the advantages discussed below.

One advantage of the invention may be that exclusive use of a credit account may increase the number of credit transactions for a credit account. A customer's exclusive use of a credit card may allow the credit card issuer to increase the volume of business transacted with vendors. The customer's outstanding balance owed may also increase.

Another advantage may be that in return for exclusive use of a credit account, the customer may earn benefits that allow for reduction of costs associated with having a credit account. Additionally, a customer may benefit by reducing the maintenance and record-keeping expenses of using and carrying various credit cards.

Yet another advantage may be that by monitoring the use of the credit account usage, a credit card issuer may be able to more closely manage the risk associated with a customer. This may result in increasing the credit limit of a credit account for a customer with a strong history.

Other advantages will be readily apparent to one having ordinary skill in the art from the following figures, descriptions, and claims.

BRIEF DESCRIPTION OF THE DRAWINGS

For a more complete understanding of the present invention and for further features and advantages, reference is now made to the following description, taken in conjunction with the accompanying drawings, in which.

DETAILED DESCRIPTION OF THE DRAWINGS

Example embodiments of the present invention and their advantages are best understood by referring now to FIGS. 1 through 4 of the drawings, in which like numerals refer to like parts.

In general, a credit card issuer may provide a customer with a credit account that offers benefits to the customer in return for dedicated use of the credit account. The customer may participate in a loyalty program or any other similar program in which a customer's credit account is established as an exclusive use credit account. The customer may accrue benefits in return for exclusive use of the credit account. In some embodiment, the exclusive use credit account may be associated with a backup credit account that may be used if the exclusive use credit account is not available, or if joint customers of a credit account wish to accrue benefits under the program. In particular embodiments, the credit card issuer determines the benefits accrued according to a customer level of usage, which the credit card issuer monitors using a credit report corresponding to the customer.

Figure 1:
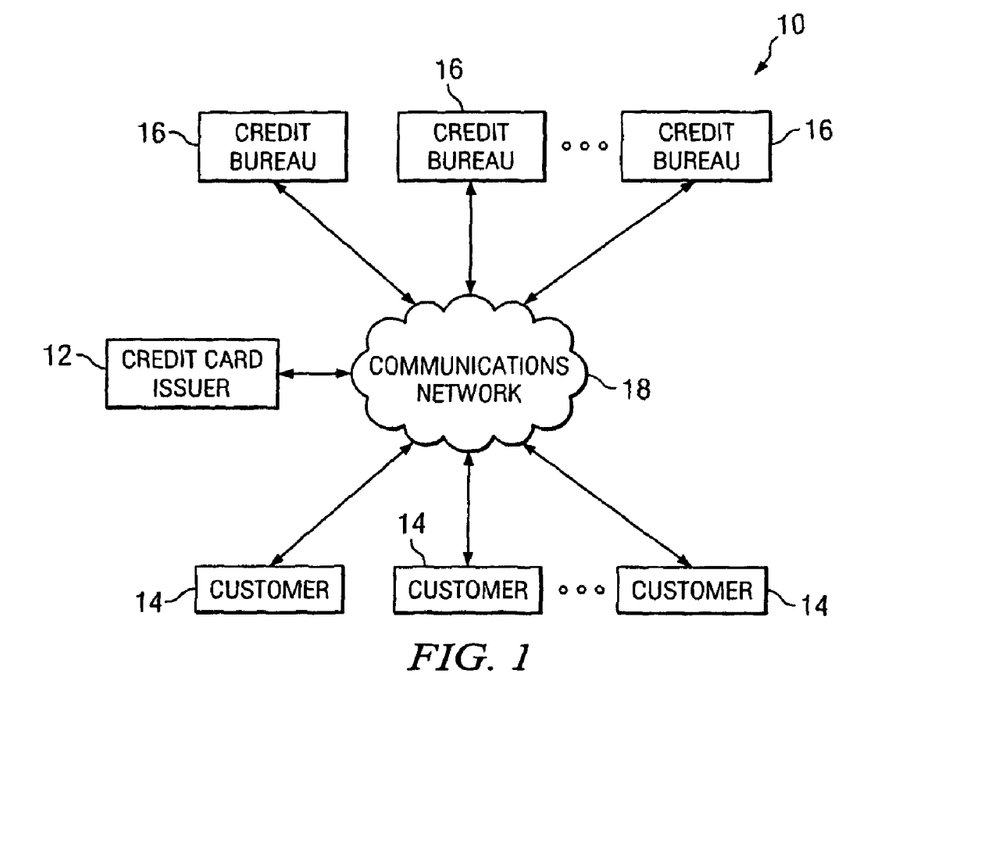
FIG. 1 is a block diagram illustrating an example of a system for handling credit accounts.

FIG. 1 illustrates an example system 10 for handling credit accounts. System 10 may include a credit card issuer 12, one or more customers 14, and one or more credit bureaus 16, which may be coupled to each other by a communications network 18. Credit card issuer 12 and customers 14 may communicate with each other using communications network 18 to transfer credit account information. For example, a customer 14 may contact credit card issuer 12 using communications network 18 to open a credit account, make inquiries or requests regarding a credit account, make payments to credit card issuer 12, or close a credit account. Credit card issuer 12 may similarly contact customer 14 to offer a credit account to customer 14, to offer benefits in exchange for participating in loyalty programs, make inquiries regarding recent charges posted to a credit account, or remind customer 14 of payments that are due.

Although credit card issuer 12 and customers 14 are described as communicating with each other using communications network 18, the present invention contemplates any suitable form of communication between credit card issuer 12 and customers 14. For example, customer 14 may contact credit card issuer 12 by telephone or by mail to make inquiries or requests regarding a credit account or to make a payment to credit card issuer 12. Similarly, credit card issuer 12 may contact customer 14 by mail or telephone to offer a credit account to customer 14 or to offer benefits to a customer in exchange for participation in a loyalty program. Credit card issuer 12 may communicate with credit bureau 16 using communications network 18 to obtain credit information regarding customers 14, as described in more detail below.

A customer 14, or cardholder 14, may comprise an individual, a group of individuals, a business organization, or any other suitable entity to which credit card issuer 12 may issue one or more credit accounts and provide one or more lines of credit. A credit bureau 16 may provide credit information regarding customers 14 to credit card issuer 12. Credit information may include credit history information, payment information, personal information regarding occupation, income, home ownership, any other suitable information, or any combination of the preceding. As an example only and not by way of limitation, a credit bureau 16 may comprise TRANS UNION, EQUIFAX, EXPERIAN, or any other suitable credit bureau. Communications network 18 may, in particular embodiments, comprise some or all of a public switched telephone network (PSTN), a public or private data network, the Internet, a wireline or wireless network, a local, regional, or global communication network, an enterprise intranet, other suitable communication link, or any combination of the preceding.

Credit card issuer 12 may include any entity suitable to provide customer 14 a credit account that may incur benefits for customer 14 in exchange for dedicated use of the credit account. According to one embodiment, the credit card issuer 12 may offer the customer participation in a loyalty program that allows the customer to receive benefits in return for exclusive use of the credit account. The terms of the loyalty program may describe the benefits and the conditions of exclusivity of use. For example, an exclusive use credit account may incur benefits if the credit account is the sole credit account the customer uses to make credit purchases. Credit card issuer 12 may periodically monitor credit information corresponding to customer 14 to ensure that the credit activity of customer 14 satisfies the exclusive use terms of the loyalty program. In one embodiment, credit card issuer 12 may discontinue the benefits if the credit information shows credit activity where customer 14 has failed to use the credit account exclusively for the benefit of the credit card issuer 12. In another embodiment, credit card issuer 12 may, upon a customer's failure to meet the terms of the loyalty program, terminate the credit account, disassociate customer 14 from the loyalty program, discontinue the benefits provided, charge a penalty fee, or take other suitable action.

As an example only and not by way of limitation, credit card issuer 12 may in particular embodiments include a merchant, a bank, a credit union, or other commercial or financial institution. Credit card issuer 12 may issue any suitable credit card for a credit account. As an example and not by way of limitation, credit card issuer 12 may issue one or more MASTERCARD, VISA, DISCOVER, DINERS CLUB, JCB or other suitable credit cards, or any combination of the preceding.

Although credit cards are particularly described, the present invention contemplates credit accounts that do not have associated credit cards. For example, credit card issuer 12 may open a credit account for a customer 14 having an associated credit account identifier but no associated credit card. In particular embodiments, a credit line associated with a credit account may have an associated credit line identifier. Customer 14 may then purchase goods or services on credit using the associated credit account identifier or credit line identifier. Reference to "credit cards" or "credit card accounts" may, where appropriate, encompass such credit accounts. Although purchases are described, the present invention contemplates any suitable transactions, for which payments may be made using credit accounts. For example, a customer 14 may use a credit account to rent one or more items.

Credit card issuer 12 may handle credit accounts, which may involve opening credit accounts for customers 14, monitoring credit accounts, billing customers 14, receiving and handling inquiries and requests from customers 14, evaluating the performance of customers 14, penalizing customers 14 for payment defaults, upgrading credit accounts, and closing credit accounts. In particular embodiments, as described more fully below, opening a credit account for a customer 14 may include establishing one or more lines of credit according to credit information from credit bureau 16 regarding customer 14, information obtained from customer 14 directly, one or more evaluations of payments received from customer 14, or other suitable information, establishing one or more terms of a credit account agreement between credit card issuer 12 and customer 14, and activating one or more services which credit card issuer 12 may provide to customer 14 in connection with the credit account.

Modifications, additions, or omissions may be made to system 10 without departing from the scope of the invention. For example, system 10 may have more, fewer, or other modules. Moreover, the operations of system 10 may be performed by more, fewer, or other modules. Additionally, functions may be performed using any suitable logic comprising software, hardware, other logic, or any suitable combination of the preceding.

Figure 2:
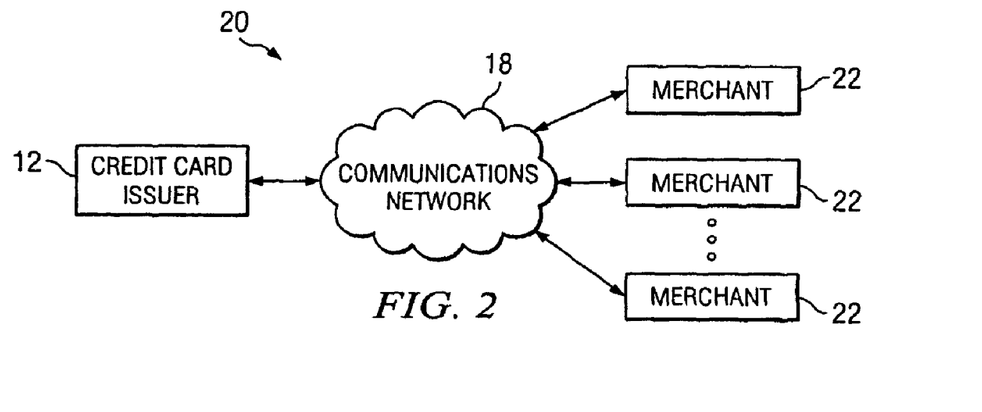
FIG. 2 is a block diagram illustrating an example of a system for handling transactions in which payments are made using a credit account.

FIG. 2 illustrates an example system 20 for handling transactions for which payments are made using credit accounts. System 20 may include credit card issuer 12 and one or more merchants 22, which may be coupled to each other by communications network 18. A merchant 22 may include any suitable entity that sells goods or services to customers 14, and may include a single entity such as an individual store or a number of entities such as a chain of stores. Merchant 22 may include a seller or distributor that sells goods produced by one or more otherwise unaffiliated producers. In addition or as an alternative, merchant 22 may include a producer that sells one or more goods it produces directly to customers 14, bypassing distributors. Merchant 22 may include one or more outlets at one or more physical locations and may, in addition or as an alternative, include one or more call centers that receive phone orders from customers 14, one or more websites or other virtual locations that receive electronic orders from customers 14, or one or more warehouses that fill orders received from customers 14, or any combination of the preceding.

Communications network 18 supporting communication between credit card issuer 12 and merchant 22 may include, as described above, comprise some or all of a public switched telephone network (PSTN), a public or private data network, the Internet, a wireline or wireless network, a local, regional, or global communication network, an enterprise intranet, other suitable communication link, or any combination of the preceding. Communications network 18 may, where appropriate, include one or more private networks used exclusively for communication between credit card issuer 12 and one or more particular merchants 22. For example, credit card issuer 12 may provide lines of credit to customers 14 to purchase items only at one or more particular merchants 22. Although credit card issuer 12 and merchants 22 are described as separate entities, in particular embodiments, credit card issuer 12 and one or more merchants 22 may be part of a single organization. For example, credit card issuer 12 may include one or more merchants 22, or one or more merchants 22 may include credit card issuer 12.

A customer 14 may purchase goods or services from a merchant 22 in any suitable manner. As an example, customer 14 may purchase goods or services from merchant 22 at a store or other physical location operated by merchant 22. As another example, customer 14 may purchase goods from merchant 22 over the telephone, by mail, or using the Internet or other suitable communications network, which may be similar to communications network 18, and the purchased goods may be subsequently shipped to customer 14.

If customer 14 purchases one or more goods or services from merchant 22, merchant 22 may generate an electronic record of the transaction and communicate the generated record to credit card issuer 12. A transaction record may be generated in any suitable manner, such as at a point-of-sale terminal or other device, and may include any suitable transaction data. For example, a transaction record may include data reflecting an account identifier such as a credit card number, a credit account identifier, a credit line identifier, or other suitable identifier, data reflecting a transaction price, data identifying merchant 22, data reflecting a transaction date, other suitable data, or any combination of the preceding. Credit card issuer 12 may use the communicated transaction record to update the credit account of customer 14 for billing and possibly for other purposes.

Modifications, additions, or omissions may be made to system 20 without departing from the scope of the invention. For example, system 20 may have more, fewer, or other modules. Moreover, the operations of system 20 may be performed by more, fewer, or other modules. Additionally, functions may be performed using any suitable logic comprising software, hardware, other logic, or any suitable combination of the preceding.

Figure 3:
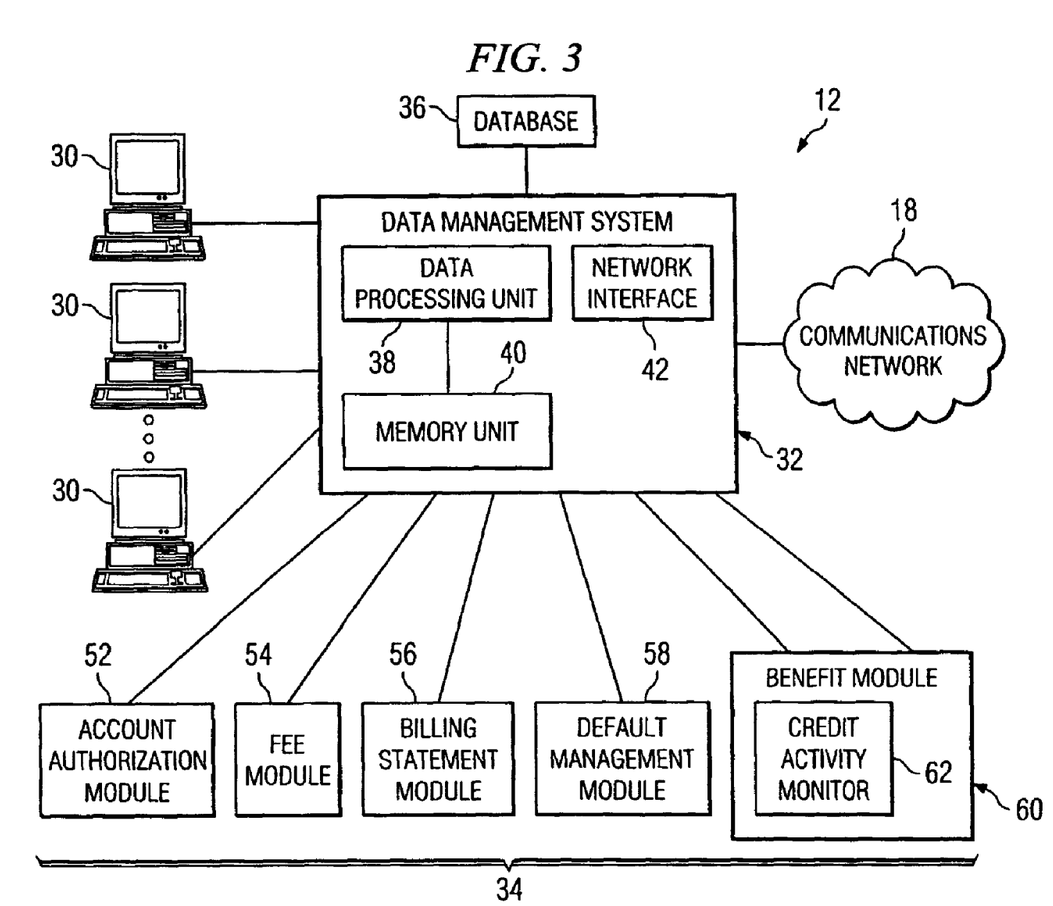
FIG. 3 is a block diagram illustrating an example of a credit card issuer in accordance with an embodiment of the present invention.

FIG. 3 illustrates an example of a credit card issuer 12. As discussed above, credit card issuer 12 may include any entity suitable to provide a customer 14 a credit account. The credit card account may be associated with a loyalty program that offers benefits in return for or "as compensation for" dedicated use of a credit account. The credit account may allow customer 14 to make purchases using credit associated with the credit account, and then make payment towards the credit account.

Terms and conditions may be used to define the credit account agreement between credit card issuer 12 and customer 14. The terms and conditions may include, for example, due dates, a grace period, payment requirements, usage requirements, benefits associated with a loyalty program, a penalty, other requirements, or any combination of the preceding. A due date refers to the date by which a satisfactory payment is due from customer 14. The grace period refers to a period of time after a due date during which payment may be made without incurring a penalty. Payment requirements describe requirements that need to be satisfied in order for a payment from customer 14 to be considered satisfactory. Usage requirements may include a requirement that the credit account be dedicated for all or a substantial majority of the customer's credit purchases. The benefits associated with a loyalty program include any benefit that the customer may receive in return for using the credit account according to the terms of dedicated use of the loyalty program. The penalty may comprise compensation that customer 14 is required to provide if the customer 14 does not submit satisfactory payment before the end of the grace period. According to one embodiment of the invention, customer 14 and credit card issuer 12 may negotiate one or more of the terms and conditions of the credit account.

Credit card issuer 12 may be used to manage dedicated use of a credit account, which may be defined by the terms of a loyalty program. The type of dedicated use of a credit account may be described by a usage requirement, such as exclusive use or backup use. Credit card issuer 12 may offer a customer participation in a loyalty program that may bind the customer to a usage requirement for which the customer may receive benefits. For example, a loyalty program may require exclusive use of the credit account issued by credit card issuer 12 so that all or a substantial majority of the credit purchases made by customer are performed using the credit account. In return for the exclusive use of the credit account, the customer may receive benefits such as a lower interest rate, a lower or waiver of minimum monthly payment, merchandise discounts and/or offers, service discounts and/or offers, credit limit privileges, credit insurance, cash, or any other suitable benefit. According to one embodiment, credit card issuer 12 may offer the benefits and also have the right to charge a penalty fee for violation of the dedicated use requirement. The benefits may be of such value and the penalty fee may be of such amount that the customer would be encouraged to satisfy the dedicated use requirement, and otherwise comply with the terms of the loyalty program. Any other suitable encouragement may be used without departing from the scope of the invention.

According to another embodiment, the loyalty program may also include a backup credit account option where a customer may use an alternate credit account if the primary credit account is not available. For example, joint credit account customers, such as a husband and wife, may each have a credit account, where the credit accounts are associated with each other as joint credit accounts. Each joint credit customer may use his/her credit account, the primary credit account, as the exclusive use credit account, while using the second of the two joint credit accounts as a backup card if the primary credit account is not available. The backup credit account option may be offered to the customer as part of the loyalty program to allow joint credit customers to incur the benefits associated with dedicated use of a credit account.

According to the illustrated embodiment, credit card issuer 12 may include one or more operator terminals 30, a data management system 32, one or more function modules 34, and a database 36. The components of credit card issuer 12 may be located at one or more sites and may be coupled to each other using one or more links, each of which may include, some or all of a computer bus, a public switched telephone network (PSTN), a public or private data network, the Internet, a wireline or wireless network, a local, regional, or global communication network, an enterprise intranet, other suitable communication link, or any combination of the preceding.

An operator terminal 30 may provide an operator access to data management system 32 to configure, manage, or otherwise interact with data management system 32. An operator terminal 30 may include a computer system. As used in this document, the term "computer" refers to any suitable device operable to accept input, process the input according to predefined rules, and produce output, for example, a personal computer, workstation, network computer, wireless data port, wireless telephone, personal digital assistant, one or more processors within these or other devices, or any other suitable processing device.

Data management system 32 may manage data associated with credit accounts, which may in particular embodiments involve creating, modifying, and deleting data files associated with credit accounts automatically or in response to data received from one or more operator terminals 30, function modules 34, or customers 14. Additionally, data management system 32 may call one or more function modules 34 to provide particular functionality according to particular needs, as described more fully below. Data management system 32 may include a data processing unit 38, a memory unit 40, a network interface 42, and any other suitable component for managing data associated with credit accounts. The components of data management system 32 may be supported by one or more computer systems at one or more sites. One or more components of data management system 32 may be separate from other components of data management system 32, and one or more suitable components of data management system 32 may, where appropriate, be incorporated into one or more other suitable components of data management system 32.

Data processing unit 38 may process data associated with credit accounts, which may involve executing coded instructions that may in particular embodiments be associated with one or more function modules 34. Memory unit 40 may be coupled to data processing unit 38, and may comprise one or more suitable memory devices, such as one or more random access memories (RAMs), read-only memories (ROMs), dynamic random access memories (DRAMs), fast cycle random access memories (FCRAMs), static random access memories (SRAMs), field-programmable gate arrays (FPGAs), erasable programmable read-only memories (EPROMs), electrically erasable programmable read-only memories (EEPROMs), microcontrollers, or microprocessors. Network interface 42 may provide an interface between data management system 32 and communications network 18 such that data management system 32 may communicate with customers 14, credit bureaus 16, merchants 22, or any combination of the preceding.

A function module 34 may provide particular functionality associated with handling credit accounts or handling transactions in which payments are made using credit accounts. As an example only and not by way of limitation, a function module 34 may provide functionality associated with risk profiling, credit account management, billing, or default management. Function module 34 may be called by data management system 32 possibly as a result of data received from an operator terminal 30 or a customer 14 via communications network 18. In response, function module 34 may provide the particular functionality associated with function module 34 in order to communicate one or more results to data processing unit 38 or one or more other suitable components of data management system 32. The communicated results may be used to create, modify, or delete one or more data files associated with one or more credit accounts, provide data to an operator at operator terminal 30 or to customer 14, or perform any other suitable task.

Function modules 34 are operable to perform various functions in the operation of credit account system 10. According to the embodiment shown in FIG. 3, function modules 34 include an account authorization module 52, a fee module 54, a billing statement module 56, a default management module 58, and a benefit module 60. Like data management system 32, function modules 34 may be physically distributed such that each function module 34 or multiple instances of each function module 34 may be located in a different physical location geographically remote from each other, from data management system 32, or both.

Account authorization module 52 may be operable to provide customers 14 a credit account that is associated with a loyalty program wherein customer 14 may receive benefits in return for dedicated use of the credit account. The loyalty program may include terms defining exclusive use and backup use of the credit account. Credit card issuer 12 may offer customer 14 participation in a loyalty program that may bind the customer to a usage requirement for which the customer may receive benefits. For example, a customer may accept to use exclusively the credit account issued by credit card issuer 12 so that all or a substantial majority of the credit purchases made by customer are performed using the credit account.

A credit account may provide one or more credit lines such as one or more revolving credit lines, one or more installment credit lines, or any combination of the preceding. A revolving credit line may comprise a short-term revolving credit line, such as a one-month revolving credit line. According to a revolving credit line, customer 14 may choose to pay the full amount of debt owed by a due date or defer payment of at least a portion of the debt to a later due date. Credit card issuer 12 typically charges customer 14 interest or finance charges for such deferred payments during the period of deferral. An installment payment credit line may allow customers 14 to pay for qualified purchases in a particular number of installments over a particular number of installment periods by specific due dates at a relatively low interest rate. For example, the installment payment credit line may allow for payment of qualified purchases in three installments over three one-month installment periods.

A credit line may have a credit limit that may be established, managed, or both based on a variety of information, including information regarding customer 14, such as credit history information received from one or more credit bureaus 16, information received from customer 14, or an evaluation of the payment performance of customer 14. The credit limit may be established, managed, or both by account authorization module 52, account upgrade module 62, as described below in greater detail, or both.

Fee module 54 may be operable to charge customer 14 a monthly fee in compensation for awarding the credit account to the customer. Fee module 54 may be operable to award other suitable compensation fees. Fee module 54 may be operable to charge fees in a variety of ways. For example, fee module 54 may charge a periodic fee, such as a monthly, semi-annual, or annual fee, for providing the extension. The monthly fee may comprise other or additional manners of compensation. As an example, customer 14 may incur an increased interest rate associated with the credit account instead of incurring a monthly fee.

Billing statement module 56 may be operable to generate billing statements for particular billing periods, provide the billing statements to customers 14, or both. In particular embodiments, billing statement module 56 is operable to generate billing statements that show the minimum payment owed by customer 14 and the due date for the minimum payment. Due dates may be established at any suitable interval of time, for example, monthly, bi-monthly, or weekly. The due dates may be defined according to any suitable manner, for example, according to a certain date of the month such as the first of the month, or according to a certain day of the month, for example, the first Monday of the month.

Default management module 58 may be operable to apply a penalty to customer 14 if customer 14 fails to make a satisfactory payment by the appropriate date, such as a due date, the end of a grace period, or other suitable date. Additionally, default management module 58 may be operable to apply a penalty fee to customer 14 if customer 14 fails to meet the terms of the loyalty program such as by failing to use the credit account exclusively for credit purchases. The terms and conditions of a credit account may specify the due dates on which payments are due, and the grace period after the due date during which a payment may be made without incurring a penalty. The penalty fee may, however, be waived by the credit card issuer 12 if customer 14 provides other compensation, such as agreeing to pay a higher interest rate associated with the credit account, or if the terms of the loyalty program do not include incurring penalty fees for failure to meet the dedicated use terms of the loyalty program.

The penalty may include, for example, a flat penalty fee, an interest charge, or other suitable penalty. The flat penalty fee may comprise a constant value, which may be defined in the terms and conditions of the credit account. An interest charge may comprise a penalty fee that is calculated according to a penalty interest amount and the amount of payment. As a example, if the amount of payment is X and the interest amount is Y, then the penalty fee is XY. Performance evaluation module 60 may be operable to evaluate the performance of customer 14 in making payments by the appropriate date, for example, the due date, the termination of the grace period, or any other suitable date.

Benefit module 60 may associate a benefit with a credit account of customer 14 in accordance with the terms of the loyalty program. According to one embodiment, benefit module 60 may associate a benefit of many benefit options associated with the loyalty program such that customer 14 may receive the benefit in return for dedicated use of the credit account. The benefit may be provided according to any suitable criteria. For example, benefit module 60 may determine a level of usage associated with the credit account using the credit history, credit report, and/or other credit information suitable for determining the level of usage that the credit account may experience. Benefit module 60 may identify the benefit to be provided according to the level of usage such that a customer 14 with a high level of usage may be offered and provided a high value benefit, while a customer 14 with a low level of usage may be offered and provided a low value benefit. Any other suitable criteria may be used to identify and provide a benefit to customer 14 without departing from the scope of the invention.

According to one embodiment, benefit module 60 includes a credit activity monitor 62 that monitors the credit card activity of customer 14 in order to identify if customer 14 is satisfying the terms of the loyalty program. For example, credit card issuer 12 may monitor a credit report comprising credit information associated with customer 14 in order to determine if customer 14 is exclusively using the credit account issued by credit card issuer 12. According to another embodiment, credit activity monitor 62 monitors the level of usage of a primary credit account and determines if a second joint account activity satisfies the terms of dedicated use of the loyalty program associated with the joint credit accounts. The credit report may be used by other function modules 34 without departing from the scope of the invention.

Modifications, additions, or omissions may be made to credit card issuer 12 without departing from the scope of the invention. For example, credit card issuer 12 may have more, fewer, or other modules. Moreover, the operations of credit card issuer 12 may be performed by more, fewer, or other modules. Additionally, functions may be performed using any suitable logic comprising software, hardware, other logic, or any suitable combination of the preceding.

Figure 4:
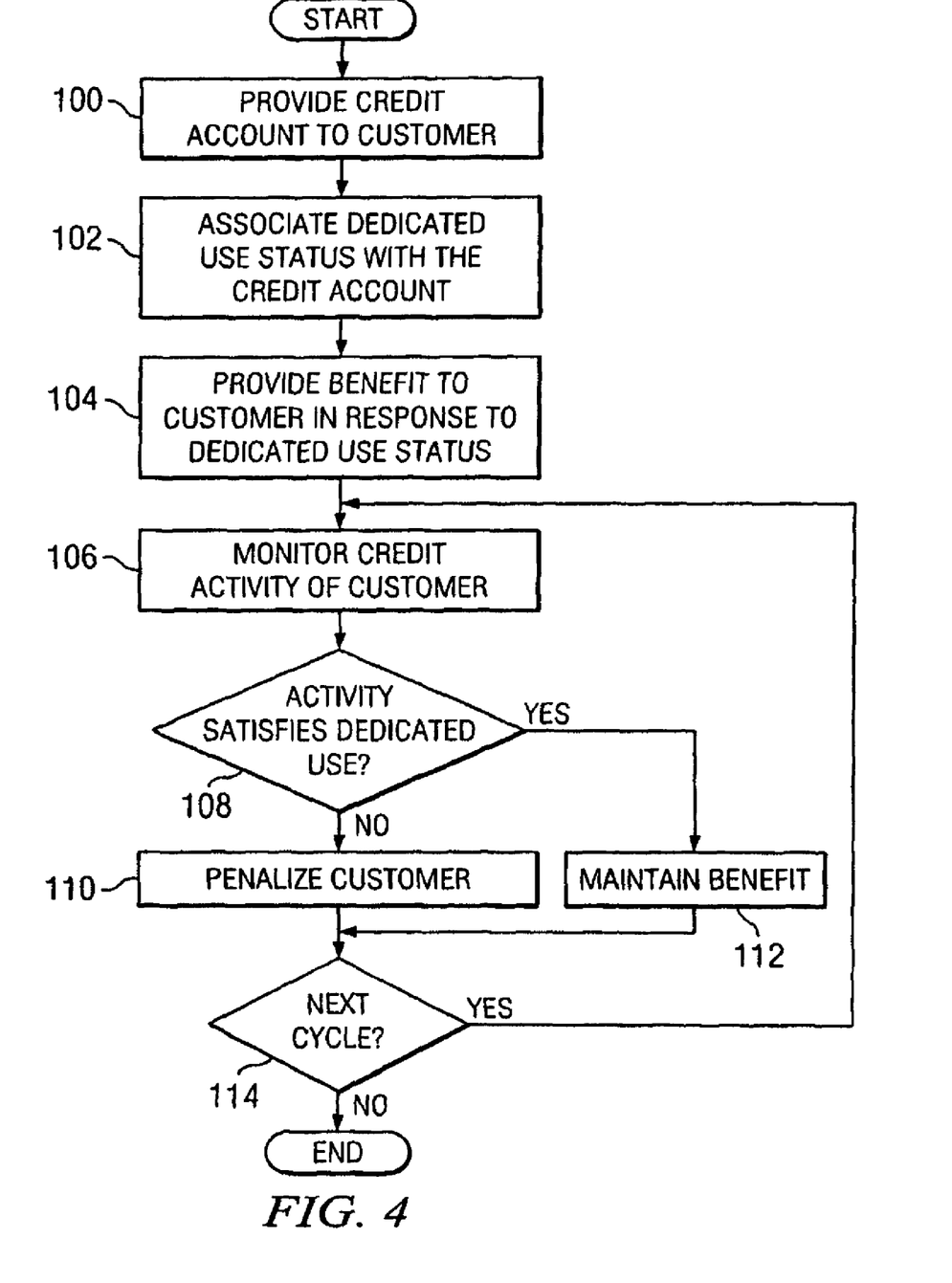
FIG. 4 illustrates a method of managing dedicated use of a credit account in accordance with an embodiment of the present invention.

FIG. 4 is a flowchart illustrating an example method for offering an extension to a grace period for a credit account. The method begins at step 100, where credit card issuer 12 provides a credit account to customer 14. According to one embodiment, the credit account may be provided by account authorization module 52 as was described with reference to FIG. 3.

At step 102, dedicated use status is associated with the credit account. Dedicated use status may comprise exclusivity use requirement or backup option requirement as was described with reference to FIG. 3. In one embodiment, customer 14 may accept an offer to join a loyalty program where benefits may be incurred in exchange for exclusive use of the credit account.

A benefit may be provided to a customer in response to the dedicated use status at step 104. In one embodiment, a benefit may be selected from any of the benefit options available from the loyalty program and according to any suitable criteria. For example, customer 14 may be provided benefits according to a benefit value that is relative to the level of usage of the credit account. According to one embodiment, benefit module 60 provides the benefit.

At step 106, the credit activity associated with customer 14 may be monitored. According to one embodiment, the credit activity monitor 62 monitors the credit activity of customer 14 by accessing a credit report. The credit report may comprise information regarding the level of usage of the credit account, whether the credit account is being used exclusively, and/or whether a joint credit account is being used as a backup card as required by the loyalty program. In one embodiment, monitoring the credit may be performed monthly, bi-monthly, annually, or at any other recurring period suitable for monitoring usage of the credit account. It will be understood that by participating in the loyalty program, customer 14 may provide authorization for credit card issuer 12 to periodically access credit information corresponding to customer 14.

A determination is made at step 108 as to whether the credit activity satisfies the dedicated use terms of the loyalty program. In one embodiment, the credit activity associated with customer 14 satisfies the dedicated use terms if the credit activity shows that the credit account is used exclusively for credit purchases. According to another embodiment, the credit activity may satisfy the dedicated use terms if the credit account is a backup account as was described with reference to FIG. 3.

If the credit activity does not satisfy the dedicated use terms, the method proceeds to step 110, where the customer may be penalized. In one embodiment, a penalty fee may be levied from customer 14 for failure to meet the dedicated use terms of the loyalty program. In another embodiment, credit card issuer 12 may penalize customer 14 by reducing the benefits provided, suspending the benefits until dedicated use of credit card resumes, terminating the credit account, or disassociating the credit account from the loyalty program. Customer 14 may be penalized in any other suitable fashion without departing from the scope of the invention.

If the credit activity satisfies the dedicated use terms at step 108, the method proceeds to step 112, where the benefits are maintained. At step 114, it is determined if a next cycle needs to be processed. According to one embodiment, a cycle may be a billing cycle, a monitoring cycle, a cycle associated with the loyalty program, or any other period of time suitable for managing a loyalty program wherein dedicated use of the credit account is monitored. If there is a next cycle to process, the method returns to step 106, where the credit activity is monitored. If there is no next cycle to process, the method terminates.

Modifications, additions, or omissions may be made to the method without departing from the scope of the invention. For example, a step may be added where credit card issuer 12 offers customer 14 participation in the loyalty program such that customer 14 incurs a benefit in exchange for dedicated use of the credit account. As another example, a step may be added where customer 14 accepts the offer. As yet another example, maintaining the benefit at step 112 may be modified to include upgrading the level of benefit and/or credit account terms if the credit activity shows a higher level of usage than predicted. Additionally, steps may be performed in any suitable order without departing from the scope of the invention. For example, providing the benefit to customer 14 in response to dedicated use status at step 104 may be performed after the dedicated use credit activity has been monitored and determined.

Although an embodiment of the invention and its advantages are described in detail, a person skilled in the art could make various alternations, additions, and omissions without departing from the spirit and scope of the present invention as defined by the appended claims.

What is claimed is:

1. A system for managing dedicated use of a credit account, comprising:
   one or more computer processors;
   an account authorization module configured to:
     receive information regarding a credit account, the credit account associated with a customer; and
     associate the credit account with a usage program, the usage program comprising one or more terms of dedicated use, the terms of dedicated use associated with providing a benefit to the customer in return for dedicated use of the credit account, the dedicated use of the credit account comprising a predetermined level of usage of the credit account by the customer in relation to one or more other credit accounts associated with the customer; and
   a benefit module configured to:
     provide the benefit to the customer according to the terms of dedicated use;
     monitor over a period of time credit activity corresponding to the credit account and activity corresponding to the one or more other credit accounts to determine if the monitored credit activity satisfies the terms of dedicated use; and
     maintain the benefit if the monitored credit activity satisfies the terms of dedicated use.

2. The system of claim 1, the benefit module further configured to penalize the customer if the monitored credit activity does not satisfy the terms of dedicated use.

3. The system of claim 1, wherein the dedicated use of the credit account further comprises exclusive use of the credit account rather than the one or more other credit accounts over the period of time.

4. The system of claim 1, the account authorization module further configured to:
   offer the customer participation in the usage program; and
   receive an acceptance of the offer from the customer.

5. The system of claim 1, wherein:
   the credit account is associated with an interest rate; and
   the benefit module is further configured to provide the benefit to the customer according to the terms by lowering the interest rate.

6. The system of claim 1, the benefit module further configured to:
   determine an original usage level associated with the credit account;
   identify the benefit from a plurality of benefit options, the benefit associated with the original usage level; and
   provide the identified benefit.

7. The system of claim 1, the benefit module further configured to monitor credit activity corresponding to the credit account by monitoring a credit report corresponding to the customer, the credit report comprising information associating the credit activity of the credit account with the customer.

8. The system of claim 2, the benefit module further configured to penalize the customer if the monitored credit activity does not satisfy the terms of dedicated use by charging a penalty fee to the customer.

9. The system of claim 1, the benefit module further configured to:
   determine an account usage level associated with the credit account based on the monitored credit activity; and
   maintain the benefit if the account usage level is greater than or equal to the predetermined level of usage.

10. A system for providing a dedicated credit account, comprising:
    one or more computer processors;
    an account authorization module configured to:
      provide a credit card customer with a credit account; and
      associate the credit account with a usage program, the usage program comprising one or more terms of dedicated use, the terms of dedicated use associated with providing a benefit to the customer in return for dedicated use of the credit account, the dedicated use of the credit account comprising a predetermined level of usage of the credit account by the customer in relation to one or more other credit accounts associated with the customer; and
    a benefit module configured to initiate the provision of the benefit to the customer if, over a period of time, monitored credit activity corresponding to the credit account satisfies the terms of dedicated use, wherein activity corresponding to the one or more other credit accounts is monitored.

11. The system of claim 10, wherein the dedicated use of the credit account further comprises exclusive use of the credit account rather than the one or more other credit accounts over the period of time.

12. The system of claim 10, wherein:
    the credit account is associated with an interest rate; and
    the benefit module is further configured to provide the benefit to the customer by lowering the interest rate.

13. The system of claim 10, the benefit module further configured to:
    determine an account usage level associated with the credit account;
    identify the benefit from a plurality of benefit options, the benefit associated with the account usage level; and
    provide the identified benefit.

14. The system of claim 10, the benefit module further configured to:
    determine an account usage level associated with the credit account; and provide the benefit if the account usage level is greater than or equal to the predetermined level of usage.

15. A method for managing dedicated use of a credit account, comprising:
providing a customer with a credit account;
using one or more computer processors, associating the credit account with a usage program comprising one or more terms of dedicated use, wherein:
the customer receives a benefit in return for satisfying the one or more terms of dedicated use, and
the dedicated use of the credit account comprises a predetermined level of usage of the credit account by the customer in relation to one or more other credit accounts associated with the customer;
receiving information regarding credit activity corresponding to the credit account and credit activity corresponding to the one or more other credit accounts; and
providing the benefit to the customer if the information indicates that the credit activity corresponding to the credit account satisfies the one or more terms of dedicated use.

16. The method of claim 15, further comprising penalizing the customer if the credit activity does not satisfy the one or more terms of dedicated use.

17. The method of claim 15, wherein the dedicated use of the credit account comprises exclusive use of the credit account.

18. The method of claim 15, wherein associating the credit account with a usage program further comprises:
offering the customer participation in the usage program; and
receiving an acceptance of the offer from the customer.

19. The method of claim 15, wherein providing the benefit to the customer further comprises:
identifying the benefit from a plurality of benefit options, the benefit associated with the credit activity; and
providing the identified benefit.

20. The method of claim 15, wherein the information comprises a credit report corresponding to the customer.

* * * * *